(12) United States Patent
Dempel et al.

(10) Patent No.: US 10,995,828 B2
(45) Date of Patent: May 4, 2021

(54) TRANSMISSION FOR A HYBRID DRIVE ARRANGEMENT, METHOD FOR OPERATING THE HYBRID DRIVE ARRANGEMENT, COMPUTER PROGRAM AND STORAGE MEDIUM

(71) Applicant: Robert Bosch GmbH, Stuttgart (DE)

(72) Inventors: Rolf Lucius Dempel, Besigheim (DE); Dominik Eszterle, Heilbronn (DE); Thomas Huber, Daisbach (DE); Christian Wirth, Eichenried (DE); Simon Brummer, Gröbenzell (DE); Tom Smejkal, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/636,065

(22) PCT Filed: Jul. 18, 2018

(86) PCT No.: PCT/EP2018/069516
§ 371 (c)(1),
(2) Date: Feb. 3, 2020

(87) PCT Pub. No.: WO2019/025187
PCT Pub. Date: Feb. 7, 2019

(65) Prior Publication Data
US 2020/0240494 A1 Jul. 30, 2020

(30) Foreign Application Priority Data

Aug. 2, 2017 (DE) .................... 10 2017 213 356.2

(51) Int. Cl.
*F16H 3/66* (2006.01)
*B60K 6/365* (2007.10)
(Continued)

(52) U.S. Cl.
CPC ............... *F16H 3/663* (2013.01); *B60K 6/24* (2013.01); *B60K 6/26* (2013.01); *B60K 6/365* (2013.01);
(Continued)

(58) Field of Classification Search
CPC .. F16H 2200/2025; F16H 3/663; F16H 3/725; F16H 2200/2005–2007; F16H 2200/202–2028
See application file for complete search history.

(56) References Cited

U.S. PATENT DOCUMENTS

| 5,135,444 | A | 8/1992 | Hattori |
| 7,300,374 | B2 * | 11/2007 | Bucknor ............. B60L 15/2054 475/5 |

(Continued)

FOREIGN PATENT DOCUMENTS

| DE | 102008052009 | 4/2010 |
| JP | 2009126233 | 6/2009 |

(Continued)

OTHER PUBLICATIONS

International Search Report for Application No. PCT/EP2018/069516 dated Nov. 2, 2018 (English Translation, 3 pages).

*Primary Examiner* — Ernesto A Suarez
*Assistant Examiner* — Lillian T Nguyen
(74) *Attorney, Agent, or Firm* — Michael Best & Friedrich LLP

(57) ABSTRACT

The invention relates to a transmission (100) for a hybrid drive arrangement which can be coupled to two drive assemblies (7, 8), comprising an input shaft (10) and an output shaft (11), at least one first and one second shifting element (SE1, SE2) and at least one double planetary gear (5). The input shaft (10) is connected to the planetary carrier of the double planetary gear (5) and the output shaft (11) can (Continued)

be coupled to the first ring gear of the double planetary gear (5) by means of the first shifting element (SE1) and can be coupled to the second ring gear of the double planetary gear (5) and by means of the second shifting element (SE2).

11 Claims, 3 Drawing Sheets

(51) Int. Cl.
*F16H 3/72* (2006.01)
*B60K 6/24* (2007.10)
*B60K 6/26* (2007.10)
*B60W 10/06* (2006.01)
*B60W 10/08* (2006.01)
*B60W 10/10* (2012.01)
*B60W 20/40* (2016.01)
*F16H 61/02* (2006.01)

(52) U.S. Cl.
CPC .......... *B60W 10/06* (2013.01); *B60W 10/08* (2013.01); *B60W 10/10* (2013.01); *B60W 20/40* (2013.01); *F16H 3/725* (2013.01); *F16H 61/0204* (2013.01); *B60Y 2200/92* (2013.01); *F16H 2200/0021* (2013.01); *F16H 2200/0047* (2013.01); *F16H 2200/2007* (2013.01); *F16H 2200/2025* (2013.01); *F16H 2200/2035* (2013.01); *F16H 2200/2038* (2013.01); *F16H 2200/2041* (2013.01)

(56) References Cited

U.S. PATENT DOCUMENTS

| | | | |
|---|---|---|---|
| 2007/0213159 A1* | 9/2007 | Bucknor | B60K 6/547 475/5 |
| 2007/0243966 A1 | 10/2007 | Holmes et al. | |
| 2007/0270262 A1* | 11/2007 | Raghavan | B60K 6/365 475/5 |
| 2008/0064550 A1* | 3/2008 | Holmes | B60K 6/365 475/5 |
| 2009/0275437 A1* | 11/2009 | Kersting | B60K 6/26 475/5 |
| 2016/0010728 A1* | 1/2016 | Scholz | F16H 3/663 475/276 |

FOREIGN PATENT DOCUMENTS

| | | |
|---|---|---|
| WO | 2010009943 | 1/2010 |
| WO | 2015082166 | 6/2015 |

* cited by examiner

|     | SE1 | SE2 | SE3 | SE4 | i  |
|-----|-----|-----|-----|-----|-----|
| G1  | x   |     | x   |     | 12 |
| G2  | x   |     |     | x   | 6  |
| G3  | x   | x   |     |     | 4  |
| G4  |     | x   |     | x   | 3  |
| G5  |     | x   | x   |     | 2  |
| E1  | x   |     |     |     | -3 |
|     |     |     |     |     |    |
| eCVT1 |   | x   |     | x   |    |
| eCVT2 |   | x   | x   |     |    |
| CH1 |     |     | x   |     |    |
| CH2 |     |     |     | x   |    |

TRANSMISSION FOR A HYBRID DRIVE ARRANGEMENT, METHOD FOR OPERATING THE HYBRID DRIVE ARRANGEMENT, COMPUTER PROGRAM AND STORAGE MEDIUM

BACKGROUND OF THE INVENTION

The invention relates to a transmission for a hybrid drive arrangement. Furthermore, the invention relates to a hybrid drive arrangement having a transmission, to a vehicle having a hybrid drive arrangement, and to a method for operating the hybrid drive arrangement, and to a computer program and a machine-readable storage medium.

Transmissions for hybrid drive arrangements are known from the prior art. For example, WO2010/009943 A1 discloses a double clutch transmission which makes the operation of a hybrid vehicle possible by way of internal combustion engine, by way of electric motor, and by way of the two drive units together. Transmissions of this type are complex, heavy and expensive. There is a requirement for transmission topologies with a reduced mechanical complexity, a decreased installation space requirement and a reduced weight.

In the following text, the term "coupled" or "attached" is used in the sense of a fixed connection. In contrast to this, the term "can be coupled" comprises both fixed and switchable connections within the context of the present description. If a switchable connection is specifically meant, the corresponding shifting element is as a rule specified explicitly, in particular a brake or a clutch. If, in contrast, a fixed, rigid or non-rotating connection is specifically meant, the term "coupled" or "attached" is as a rule used and the use of the term "can be coupled" is dispensed with. The use of the term "can be coupled" without specification of a specific shifting element therefore indicates the intentional inclusion of the two types. This distinction takes place solely for the benefit of improved comprehensibility and, in particular, in order to clarify where the provision of a switchable connection instead of a fixed connection or coupling which can as a rule be realized more easily is absolutely necessary. The above definition of the term "coupled" or "attached" is therefore in no way to be interpreted to be so narrow that couplings which are inserted arbitrarily for bypassing purposes are derived from its literal sense.

SUMMARY OF THE INVENTION

A transmission for a hybrid drive arrangement is provided, which transmission can be coupled to two drive units, having an input shaft and an output shaft, at least a first and a second shifting element, and at least one double planetary transmission, having a first sun gear and a first internal gear and a second sun gear and a second internal gear and a planetary carrier, the input shaft being coupled to the planetary carrier of the double planetary transmission, and it being possible for the output shaft to be coupled by means of the first shifting element to the first internal gear of the double planetary transmission and by means of the second shifting element to the second internal gear of the double planetary transmission.

A transmission for a hybrid drive arrangement is provided. For the operation of the hybrid drive arrangement, two drive units can be coupled to the transmission. The transmission comprises an input shaft and an output shaft, at least a first and a second shifting element, and at least one double planetary transmission having a first sun gear and a first internal gear and a second sun gear and a second internal gear and an (in particular, common) planetary carrier. In particular, the first and the second sun gear are externally toothed. In particular, the first and the second internal gear are internally toothed. First planets are in engagement and mesh with the first internal gear, orbiting the first sun gear in a spaced apart manner. Second (in particular, stepped) planets are in engagement with the first sun gear, the first planets, the second sun gear and the second internal gear, the second planets orbiting the first and the second sun gear in a meshing manner and meshing with the second internal gear and the first planets. In particular, the first and second planets are externally toothed. A common planetary carrier fixes the spacings of the first and second planets from one another and in each case among one another. The input shaft is coupled to the planetary carrier of the double planetary transmission. Within the context of the description, a coupling is to be understood to mean a connection which is configured rigidly, for example in one piece, for example by means of a shaft, or with a fixed transmission or transmission stage. The output shaft can be coupled by means of the first shifting element to the first internal gear of the double planetary transmission and can be coupled by means of the second shifting element to the second internal gear of the double planetary transmission. In particular, the output shaft can be coupled to an output. The output is, in particular, a shaft or an axle which transmits the movement of the output shaft to the mechanical drive train of a vehicle, for example to a differential or to a drive wheel. A transmission is advantageously provided which transmits the rotational speed and the torque which prevails at the input shaft to the output shaft in accordance with the transmission ratios in the transmission in the case of a closed first and second shifting element. In the case of an open first and second shifting element, the input shaft is decoupled from the output shaft.

In another refinement of the invention, the transmission comprises a third shifting element which is set up to brake or to release the first sun gear of the double planetary transmission (5).

A third shifting element is provided for the transmission, which third shifting element makes releasing or braking of the first sun gear of the planetary transmission possible, in particular a connection of the sun gear or a support of the sun gear on a fixed point or on a housing of the transmission. The braking of the first sun gear comprises the reducing of the rotational speed of the sun gear, in particular as far as a standstill of the sun gear. The releasing of the first sun gear comprises the releasing of the brake, with the result that the first sun gear accelerates in accordance with the forces which act on the first sun gear. In addition to the above-mentioned operating modes, further operating modes can advantageously be set by way of the above-described topology of the transmission with the first to third shifting elements. Thus, a closed first and third shifting element and an open second shifting element result in the highest transmission ratio which can be achieved by way of said transmission between the input shaft and the output shaft.

In another refinement of the invention, the transmission comprises a fourth shifting element which is configured to brake or to release the second sun gear of the planetary transmission.

A fourth shifting element is provided for the transmission, which fourth shifting element makes releasing or braking of the second sun gear of the planetary transmission possible, in particular connecting of the second sun gear or supporting of the second sun gear on a fixed point or on a housing of the transmission. The braking of the second sun gear comprises the reducing of the rotational speed of the internal gear, in particular as far as a standstill of the internal gear. The releasing of the second sun gear comprises the releasing of the brake, with the result that the second sun gear accelerates in accordance with the forces which act on the second sun gear. In addition to the abovementioned operating modes, further operating modes can advantageously be set by way of the above-described topology of the transmission with the first to fourth shifting elements. Thus, a closed first and fourth shifting element and an open second and third shifting element result, in particular, in a second highest transmission ratio which can be achieved by way of said transmission between the input shaft and the output shaft. A closed fourth and second shifting element and an open first and third shifting element result, in particular, in a fourth highest transmission ratio which can be achieved by way of said transmission between the input shaft and the output shaft.

In a further refinement of the invention, the first, second and/or the third shifting element comprise/comprises a clutch.

In order to connect the output shaft to said components of the planetary transmission, the first and/or the second shifting element are/is configured as a clutch. A clutch of this type can be, in particular, a dry clutch, a wet clutch or a claw coupling. Possibilities for a controllable connection of the output shaft to the components of the planetary transmission are advantageously provided.

In another refinement of the invention, the third and/or fourth shifting element comprise/comprises a brake.

The third and/or fourth shifting element is configured as a brake, in particular a dry brake or wet brake or as a claw coupling. A possibility for controllably releasing and braking the first or second sun gear of the double planetary transmission is advantageously provided.

In another refinement of the invention, a first drive unit, in particular an internal combustion engine, can be coupled to the input shaft, and/or a second drive unit, in particular an electric machine, can be coupled to the first internal gear of the double planetary transmission.

The first drive unit can be attached on the input shaft on the input side. The second drive unit can be coupled to the first internal gear of the double planetary transmission. For generator operation of the second drive unit, for example an electric machine, for example in order to charge a battery, the first drive unit or the internal combustion engine can advantageously be connected to the electric machine by means of closing of the third or the fourth shifting element and opening of the second shifting element. Since the two drive units are decoupled here from the output shaft and therefore no torque is transmitted to the output shaft, said charging can take place in the case of an output shaft which is at a standstill, for example, that is to say, for example, during the standstill of a vehicle (standstill charging). In the case of an output shaft which is, for example, at a standstill, a direct transmission of the rotational energy of the first drive unit to the second drive unit or vice versa is made possible, for example in order to start an internal combustion engine.

Power-split operation of the transmission (eCVT mode) is made possible by way of closing of the second and the third or fourth shifting element and opening of the first shifting element. Here, the first drive unit acts on the planetary carrier of the double planetary transmission, and the electric machine acts on the first internal gear of the double planetary transmission, the second internal gear of which is connected via the second switching element to the output shaft. Here, the transmission ratio between the input shaft and the output shaft can be varied continuously over a wide range by means of specification of a rotational speed or a torque of the second drive unit. Power-split operation (also called eCVT mode) is advantageously made possible, in the case of which both the propulsion power at the output shaft and the charging power for the generator operation of the electric machine can be set independently of one another. Charging at a standstill or in crawling mode (>0 km/h to approximately 10 km/h) and a smooth comfortable transition from the standstill charging mode into the crawling charging mode and the driving mode is advantageously made possible with a fixed transmission, that is to say in a fixed gear.

In the case of an open first and second shifting element, the input shaft, and therefore the first drive unit, is decoupled from the output shaft. In the case of a closed first shifting element and an open second, third and fourth shifting element, the second drive unit is connected via a fixed transmission ratio to the output shaft, with the result that driving of the output shaft can take place only by means of the second drive assembly at a fixed transmission ratio. By means of (in particular, metered) closing of the third shifting element, the first drive unit can be driven and, for example, can be started if the first drive unit is an internal combustion engine while driving by means of the second drive unit.

There is also the possibility that the first drive unit is configured, for example, as an electric machine, and the second drive unit is configured, for example, as an internal combustion engine. In a configuration of this type, different functionalities and operating modes for the interaction of the components can result by means of the transmission, which are not described further here.

In another refinement of the invention, the transmission ratios of the transmission are changed without the traction force being interrupted.

Changing of the transmission ratios of the transmission, in particular shifting into another gear or into another operating mode of the transmission, takes place without the traction force being interrupted if, in particular, for the change from one operating mode of the transmission into another, one of the shifting elements retains its state, a second one of the shifting elements is transferred from a closed state into an open state, and a third one of the shifting elements is transferred from an open state into a closed state. A transmission is advantageously provided, in the case of which changing of the gear stages without an interruption of the traction force is made possible.

In another refinement of the invention, the transmission comprises an actuator for actuating at least one of the shifting elements in a manner which is dependent on a predefined operating specification signal.

An actuator is provided which actuates at least one of the shifting elements in a manner which is dependent on a predefined operating specification signal, for example a requested torque, a predefined rotational speed, or a defined operating point of the drive unit. Said parameters of the operating specification signal can be related to the output shaft of the transmission, to the input shaft, or to the shafts which are to be connected to the drive units. Control of the transmission is advantageously made possible.

Furthermore, the invention relates to a hybrid drive arrangement having a transmission, the hybrid drive arrangement comprising a second drive assembly and/or a pulse inverter, an electric energy source or a first drive unit.

A hybrid drive arrangement having an above-described transmission is provided. The hybrid drive arrangement comprises a second drive assembly. In particular, the hybrid drive arrangement comprises a pulse inverter, an electric energy source and/or a first drive unit. The second drive unit is coupled or connected, in particular, to the first internal gear of the double planetary transmission. The pulse inverter is provided, in particular, for supplying the second drive unit, in particular an electric machine. To this end, in particular, it converts the electric energy of an electric energy source, for example a battery and/or a fuel cell. The first drive unit is coupled or connected, in particular, to the input shaft. A hybrid drive arrangement which is set up for use in a vehicle is advantageously provided.

Furthermore, the invention comprises a vehicle having a described hybrid drive arrangement. A vehicle which comprises a hybrid drive arrangement is advantageously provided.

Furthermore, the invention comprises a method for operating a hybrid drive arrangement having a transmission. The method comprises the following steps:
determining of an operating specification signal;
actuating of at least one of the shifting elements in order to set the functionality of the transmission in a manner which is dependent on the operating specification signal (BV).

A method for operating a hybrid drive arrangement having a transmission is provided. Here, an operating specification signal is determined. At least one of the shifting elements is closed or opened in order to set the functionality of the transmission or of a corresponding operating mode in a manner which is dependent on the operating specification signal. The operating specification signal is predefined in a manner which is dependent on an operating strategy, a driver request or accelerator pedal, a battery management system or other systems which are available, for example, in a vehicle. In a manner which is dependent on said operating specification signal, the shifting elements are actuated in order to set the corresponding functionality or the operating mode of the transmission, in particular the clutches or brakes are closed or opened. The functionality of the transmission or the operating mode are, in particular, the different transmission ratios of the various gear stages, or the various modes or operating modes, for example generator operation of the second drive unit in the case of a stationary output shaft or the eCVT mode. A method for operating a hybrid drive arrangement is advantageously provided.

Furthermore, the invention relates to a computer program which is set up to carry out the described method.

Furthermore, the invention relates to a machine-readable storage medium, on which the described computer program is stored.

BRIEF DESCRIPTION OF THE DRAWINGS

It goes without saying that the features, properties and advantages of the transmission relate and/or can be applied accordingly to the hybrid drive arrangement, the vehicle and/or the method, and vice versa. Further features and advantages of embodiments of the invention result from the following description with reference to the appended drawings.

In the following text, the invention is to be described in greater detail on the basis of some figures, in which.

DETAILED DESCRIPTION

Figure 1:
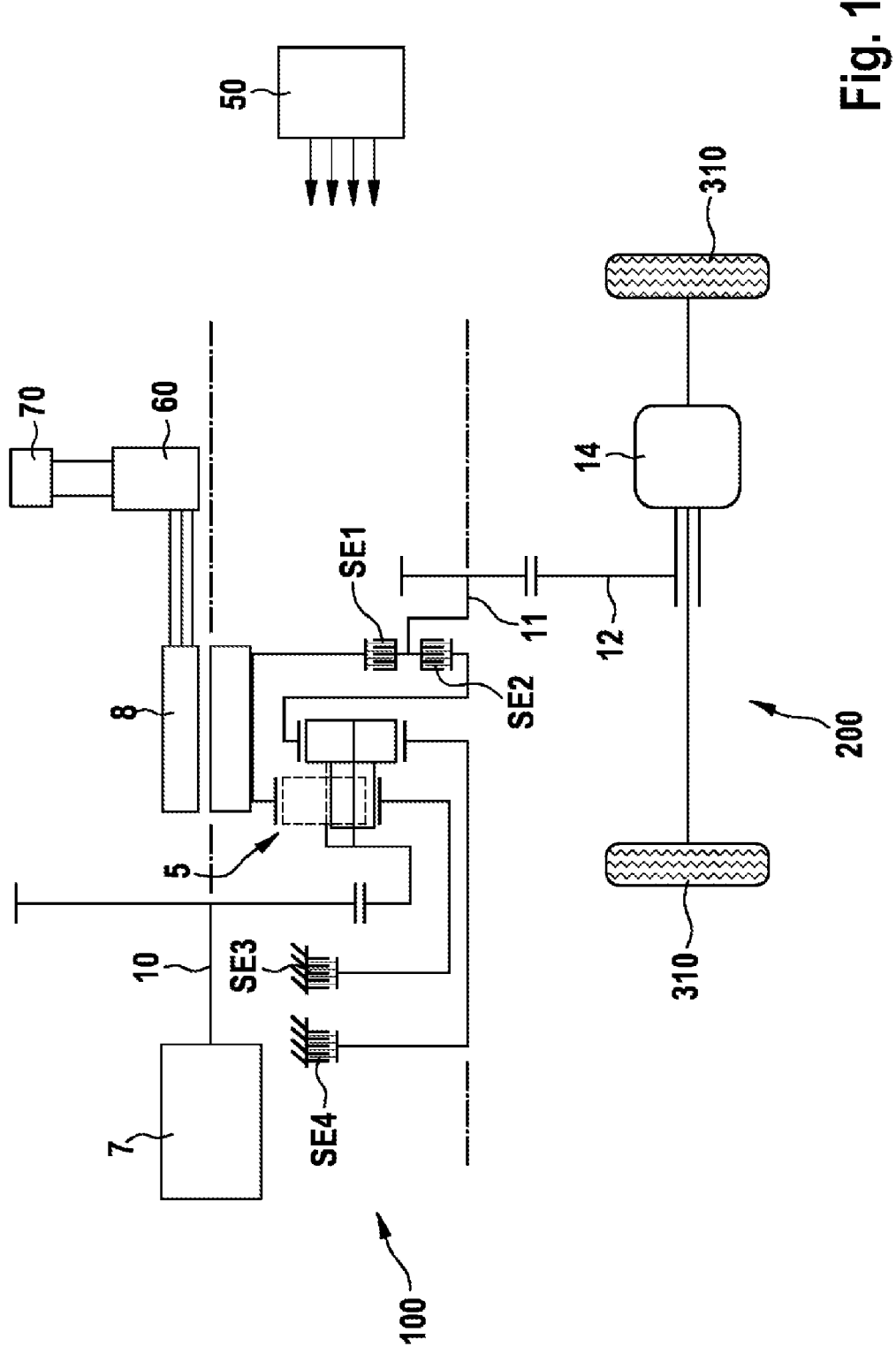
FIG. 1 shows a diagrammatic illustration of the hybrid drive train arrangement having a transmission.

FIG. 1 shows a hybrid drive train arrangement 200 having a first drive unit 7, in particular an internal combustion engine, and a second drive unit 8, in particular an electric machine, and a transmission 100. In particular, the hybrid drive train arrangement comprises a pulse inverter 60 for supplying the second drive unit 8 with electric energy. Furthermore, the hybrid drive train arrangement 200 comprises, in particular, an electric energy source 70 which is connected to the pulse inverter 60. The transmission 100 comprises the input shaft 10 and the output shaft 11. Furthermore, the transmission 100 comprises a double planetary transmission 5 having a first sun gear and a first internal gear and a second sun gear and a second internal gear and an (in particular, common) planetary carrier. In particular, the first and the second sun gear are externally toothed. In particular, the first and the second internal gear are internally toothed. First planets are in engagement and mesh with the first internal gear, orbiting the first sun gear in a spaced apart manner. Second (in particular, stepped) planets are in engagement with the first sun gear, the first planets, the second sun gear and the second internal gear, the second planets orbiting the first and the second sun gear in a meshing manner and meshing with the second internal gear and the first planets. In particular, the first and second planets are externally toothed. A common planetary carrier fixes the spacings of the first and second planets from one another and among one another. Furthermore, the transmission 100 comprises a first and a second shifting element SE1, SE2. The first shifting element SE1, in particular a clutch, is set up to connect or to disconnect the first internal gear of the double planetary transmission 5 to/from the output shaft 11. The second shifting element SE2, in particular a clutch, is set up to connect or to disconnect the second internal gear of the double planetary transmission 5 to/from the output shaft. Furthermore, the transmission 100 can have a third shifting element SE3. The third shifting element SE3, in particular a brake, is set up to release or to brake the first sun gear of the double planetary transmission 5, in particular by the brake connecting the internal gear to a fixed point or, for example, supporting it on the housing (not shown) of the transmission 100. Furthermore, the transmission 100 can comprise a fourth shifting element SE4. The fourth shifting element SE4, in particular a brake, is set up to release or to brake the second sun gear of the double planetary transmission 5, in particular by the brake connecting the internal gear to a fixed point or, for example, supporting it on the housing (not shown) of the transmission 100. Furthermore, the transmission is set up to be coupled or connected to a first drive unit via the input shaft 10 for operation. To this end, FIG. 1 shows that the shaft of the drive unit 7 is connected to the input shaft 10, for example via a spur gear set. The second drive unit 8, in particular an electric machine, is connected to the first internal gear of the double planetary transmission for the operation of the transmission 100, as shown in FIG. 1. For an optimization of the transmission ratios, the output shaft 11 is connected, for example, to a differential 14, for example via an output 12, in particular a spur gear set, via which differential 14 the movements are transmitted to the wheels 310. An actuator 50 is provided for actuating the shifting elements, which actuator 50 carries out the method for operating the hybrid drive arrangement having the transmission. The control lines between the actuator 50 and the individual shifting elements SE1 . . . SE4 are indicated merely as an arrow for reasons of clarity and are not shown completely. The communication between the shifting elements SE1 . . . SE4 and the apparatus can take place by means of the control lines and also by means of a bus system or in a wireless manner.

Figures 2, 3:
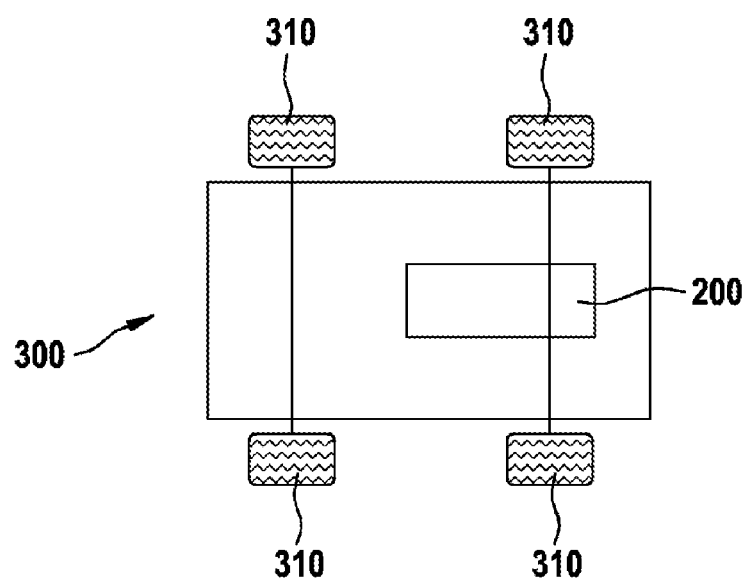
FIG. 2 shows a shifting matrix of the transmission.
FIG. 3 shows a diagrammatically illustrated vehicle having a hybrid drive train arrangement.

FIG. 2 shows a shifting matrix of the transmission. The individual shifting elements SE1 . . . SE4 are indicated in the columns, and an approximate transmission ratio which results between one of the drive units and the output shaft is shown in the last column by way of example. The different gear stages, gears or operating modes of the transmission are indicated in the rows. Crosses in the shifting matrix show which of the shifting elements have to be activated, in order that the corresponding gear or operating mode is set. Here, activation of the shifting elements means, in particular, that a clutch is closed or a brake is actuated, with the result that a force is transmitted via the clutch from one shaft to a further shaft or a force is transmitted by means of the brake to a fixed point, in particular the transmission housing. It can be seen from the shifting matrix that, depending on the combination of the four shifting elements, five gears G1 . . . G5 can be set, the first gear G1 having the highest transmission ratio and the fifth gear G5 having the lowest transmission ratio. In the case of the gears G1 . . . G5, a fixed rotational speed ratio in accordance with the transmission ratio indicated in the last column preferably prevails in each case between the first drive unit 7 and the output shaft 11. In the gears G1 . . . G5, the output shaft is driven either by the first drive unit 7 alone or together with the second drive unit 8. In particular, these are internal combustion engine or hybrid gears, for example if the first drive unit 7 is an internal combustion engine and the second drive unit 8 is an electric machine. Said gears also make it possible to raise the load point of the internal combustion engine, with the result that the electric machine can be operated as a generator, and charging of a battery can take place during operation, in particular driving operation of a vehicle. The gear E1 or operating mode, in which only the second drive unit 8 is connected to the output shaft 11, is also shown in the following lines of the matrix. To this end, in particular, the second, the third and the fourth shifting element SE2, SE3, S4 has to be open and the first shifting element SE1 has to be closed, in order that there is no connection to the first drive unit 7. This is, in particular, an electric motor gear, for example if the second drive unit is an electric machine. A vehicle can advantageously be operated locally without emissions in said gear. By way of example, in the case of the connection of the second drive unit 8 by means of the first shifting element SE1 to the output shaft 11, this results in the transmission ratio which is indicated in the shifting matrix between the second drive unit 8 and the output shaft 11.

Closing of the second and third or fourth shifting element SE2, SE3, SE4 and opening of the first shifting element SE1 result in two power split operating modes, the eCVT modes eCVT1, eCVT2, which in each case make mutually independent propulsion power at the output shaft 11 and charging power of the second drive unit 8 possible. In particular, said operating modes are suitable for hybrid driving off in the case of a low battery charging state, since stepless changing of the transmission ratios and therefore, in particular, stepless acceleration are possible in the case of a simultaneous generator operation of the second drive unit 8.

Two further modes (called CH1, CH2 or else stationary charging) result if the third shifting element SE3 or the fourth shifting element SE4 are closed and all further shifting elements are open. Here, the drive units 7 and 8 are coupled to one another, there not being a connection to the output shaft 11. In said operating mode, the second drive unit 8 can be driven by means of the first drive unit 7 during the standstill of the output shaft, in particular of a vehicle, in particular can be used in the manner of a generator for charging an electric energy source 70, in particular a battery. As an alternative, the first drive unit 7 can also be driven by means of the second drive unit 8, and, for example, an internal combustion engine start or a diagnosis of the internal combustion engine can be carried out if the first drive unit 7 is an internal combustion engine and the second drive unit 8 is an electric machine.

FIG. 3 shows a vehicle 300 with wheels 310, the vehicle comprising a hybrid drive arrangement 200, as described above.

Figure 4:
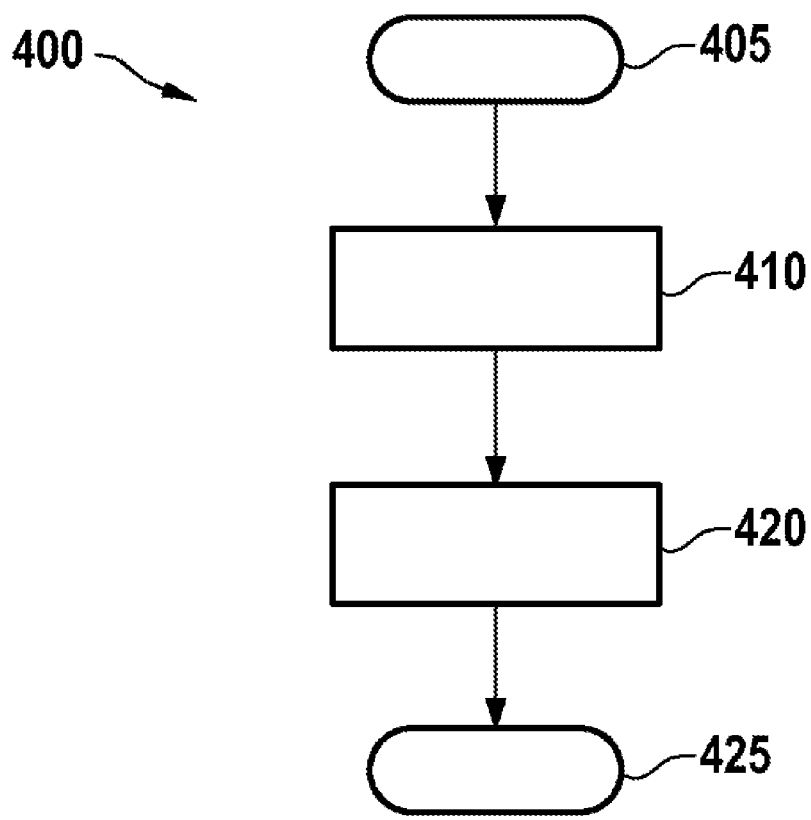
FIG. 4 shows a diagrammatically illustrated method for operating a hybrid drive train arrangement.

FIG. 4 shows a flow chart of a method 400 for operating a hybrid drive arrangement 200 having a transmission 100. The method starts with step 405. In step 410, an operating specification signal BV is determined and, in step 420, at least one of the shifting elements SE1 . . . SE4 is actuated in order to set the functionality of the transmission 100 in a manner which is dependent on the operating specification signal BV. The method ends with step 425. Here, the operating specification signal BV is either a parameter for a physical variable in the transmission 100, such as a torque or a rotational speed or a power output to be transmitted which is to prevail at or to be transmitted to a component of the transmission 100. Said components are, in particular, the input shaft 10, the output shaft 11, but also the parameters at the drive units 7, 8 or the shifting elements SE1 . . . SE4. Moreover, the operating specification signal BV can also represent a defined operating mode such as one of the five gears G1 . . . G5 or the gear E1 which is operated only by way of the second drive unit, or else can represent the special functions eCVT1, eCVT2 or standstill charging CH1, CH2. In a manner which is dependent on said operating specification signal BV, the shifting elements SE1 . . . SE4 are actuated in accordance with the shifting matrix, in order to shift the transmission 100 into the corresponding gear or operating mode. For a shift between the individual gears or operating modes with no interruption of the tractive force, it is necessary that one of the shifting elements SE1 . . . SE4 retains its state before and after the shifting operation, a further shifting element moving during the shifting from the open into the closed state, whereas another shifting element moves from the closed into the open state.

The invention claimed is:

1. A transmission (100) for a hybrid drive arrangement, the transmission (100) configured to be coupled to two drive units (7, 8), and comprising:
an input shaft (10) and an output shaft (11),
at least a first and a second shifting element (SE1, SE2) and at least one double planetary transmission (5), having a first sun gear and a first internal gear and a second sun gear and a second internal gear and a planetary carrier, the input shaft (10) being coupled to the planetary carrier of the double planetary transmission (5), the transmission (100) further configured to couple the output shaft (11) via the first shifting element (SE1) to the first internal gear of the double planetary transmission (5) and via the second shifting element (SE2) to the second internal gear of the double planetary transmission (5), and additionally configured to couple an internal combustion engine to the input shaft (10), and an electric machine to the first internal gear of the double planetary transmission (5).

2. The transmission as claimed in claim 1, further comprising a third shifting element (SE3) which is set up to brake or to release the first sun gear of the double planetary transmission (5).

3. The transmission as claimed in claim 1, further comprising a fourth shifting element (SE4) which is set up to brake or to release the second sun gear of the planetary transmission (5).

4. The transmission as claimed in claim 1, wherein the first, the second shifting element, or both the first and seconding shifting element (SE1, SE2) comprise a coupling.

5. The transmission as claimed in claim 1,
the third, the fourth, or both the third and fourth shifting element (SE3, SE4) comprise a brake.

6. The transmission as claimed in claim 1 further configured to change the transmission ratios of the transmission (100) without the traction force being interrupted.

7. The transmission as claimed in claim 1, further comprising an actuator (50) for actuating at least one of the shifting elements (SE1 . . . SE4) in a manner which is dependent on a predefined operating specification signal (BV).

8. The hybrid drive arrangement (200) having a transmission (100) as claimed in claim 1, the hybrid drive arrangement comprising a second drive unit (8), a pulse inverter (60), an energy source (70), a first drive unit (7), or a combination of the same.

9. A vehicle (300) having a hybrid drive arrangement (200) as claimed in claim 8.

10. A method (400) for operating a hybrid drive arrangement (200) having a transmission (100) as claimed in claim 1, the method comprising:
   determining (410) an operating specification signal (BV)
   actuating (420) at least one of the shifting elements (SE1 . . . SE4) in order to set the functionality of the transmission (100) in a manner which is dependent on the operating specification signal (BV).

11. A non-transitory, computer readable storage medium comprising instructions which when executed by a computer cause the computer to control a hybrid drive arrangement (200) having a transmission (100) that is configured to be coupled to two drive units (7, 8), and includes
   an input shaft (10) and an output shaft (11), at least a first and a second shifting element (SE1, SE2), and
   at least one double planetary transmission (5), having a first sun gear and a first internal gear and a second sun gear and a second internal gear and a planetary carrier, the input shaft (10) being coupled to the planetary carrier of the double planetary transmission (5),
   the transmission (100) further configured to couple the output shaft (11) via the first shifting element (SE1) to the first internal gear of the double planetary transmission (5) and via the second shifting element (SE2) to the second internal gear of the double planetary transmission (5), and additionally configured to couple an internal combustion engine to the input shaft (10), and an electric machine to the first internal gear of the double planetary transmission (5),
   wherein the instructions when executed by the computer further cause the computer to
   determine (410) an operating specification signal (BV); and
   actuate (420) at least one of the shifting elements (SE1 . . . SE4) in order to set the functionality of the transmission (100) in a manner which is dependent on the operating specification signal (BV) transmission.

* * * * *